United States Patent
Naito et al.

(10) Patent No.: US 6,495,938 B2
(45) Date of Patent: Dec. 17, 2002

(54) BRUSHLESS MOTOR, METHOD FOR OPERATING BRUSHLESS MOTOR AND METHOD FOR MANUFACTURING BRUSHLESS MOTOR

(75) Inventors: Hayato Naito, Nagano (JP); Izumi Komatsu, Nagano (JP); Satohi Tanimura, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/766,492

(22) Filed: Jan. 18, 2001

(65) Prior Publication Data

US 2002/0047361 A1 Apr. 25, 2002

(30) Foreign Application Priority Data

Jan. 20, 2000 (JP) .................................. 2000-011161

(51) Int. Cl.⁷ .............................................. H02K 11/00
(52) U.S. Cl. ................... 310/71; 310/68 R; 310/DIG. 6
(58) Field of Search .................................. 310/71, 68 R, 310/DIG. 6; 361/799

(56) References Cited

U.S. PATENT DOCUMENTS 5,408,207 A * 4/1995 Chanteau ..................... 29/840
6,094,361 A * 7/2000 Batten et al. ........... 174/35 GC

* cited by examiner

Primary Examiner—Burton S. Mullins
(74) Attorney, Agent, or Firm—Hogan & Hartson, LLP

(57) ABSTRACT

A direct PWM brushless motor has a motor main body mounted on a metal substrate and a motor drive circuit formed on a circuit substrate that is separated from the metal substrate. The motor drive circuit includes switching elements that are directly turned on and off, in which a switching pulse width for the switching elements is modulated to control current conducting through drive coils. The direct PWM brushless motor has a wiring cable connection device for connecting the motor main body and a fixed potential of the motor drive circuit, and a conduction device that conductively connects a metal plate portion of the metal substrate to the wiring cable connection device.

14 Claims, 8 Drawing Sheets

BRUSHLESS MOTOR, METHOD FOR OPERATING BRUSHLESS MOTOR AND METHOD FOR MANUFACTURING BRUSHLESS MOTOR

BACKGROUND OF THE INVENTION

Field of the Invention

The present invention relates to a brushless motor that may be used as a capstan motor for a video player or the like, an operation method therefor and a manufacturing method therefor. More particularly, the present invention relates to a direct pulse width modulation (PWM) brushless motor, an operation method therefor and a manufacturing method therefor.

A typical brushless motor may be used as a capstan motor for a video player or the like that is a main apparatus for the brushless motor. As shown in FIG. 1, the brushless motor is generally composed of a motor main body 11 mounted on a metal substrate 40 and a motor drive circuit (not shown) that drives the motor main body 11. The motor main body 11 has a bearing 20, a rotor shaft 10 rotatably supported by he bearing 20, a rotor 5 capable of rotating with the rotor shaft 10 in one piece, an a stator 30 having cores 32 with driving coils 31 wound around the cores 32. If the motor drive circuit is not provided on the metal rate 40 but is provided on a separate control circuit substrate in the main apparatus (i.e., the video player or the like), the motor main body 11 and the motor drive circuit may need to be connected to each other by wirings. Accordingly, a connector 8 may be mounted on the metal substrate 40 for connecting the motor main body 11 to the motor drive circuit.

FIG. 8 shows an electrical connection structure in the brushless motor 1 in which the motor main body 11 is electrically connected to the motor drive circuit through the connector 8.

Referring to FIG. 8, a motor drive circuit 6 that is equipped with a driver IC 60 is formed with other control circuits for the main apparatus at a location other than the metal substrate 40, such as, for example, in a circuit substrate of the main apparatus. The driver IC 60 has built-in power transistors (i.e., switching elements) Q1–Q4, for example. The motor drive circuit 6 is supplied with a motor power source potential VM, a motor ground potential M.GND, an IC power source potential Vcc and an IC grand potential S.GND. Also, the motor drive circuit 6 and the motor main body 11 are electrically connected to each other through the connector 8 in the following manner. The connector 8 has twelve connector pins 801 through 812. Among the twelve pins, the connector pins 801 through 803 are used for power supply to three driving coils 31 of the motor. The connector pins 804 and 812 are used for supplying the IC power source potential Vcc and the IC grand potential S.GND to three Hall elements H and a sensor FG that is used for speed control of the motor. The connector pins 805 through 811 are used for outputting signals from the Hall elements H or the sensor FG.

In the brushless motor thus structured, the power transistors built in the driver IC 60 are directly turned on and off. Furthermore, the brushless motor uses a direct PWM control system in which the switching pulse width applied to the switching elements is modulated to control current that is conducted through the driving coils.

By the direct PWM control system, the power consumption, which may be wasted through heat generation of the driver IC, is substantially reduced. Therefore, the direct PWM control system is greatly effective in reducing the energy consumption for driving the motor. In addition, the direct PWM control system is effective in reducing the cost because it-can be implemented with almost no additional parts.

A typical direct PWM control system is described with reference to FIGS. 2(A), 2(B), 3 and 4. FIG. 2(A) shows a state of the driver IC 60 of the brushless motor with a direct PWM control system in which power is supplied from a motor power supply source to the driving coils 31. FIG. 2(B) shows a state in which regeneration current flows by a back electromotive force that is generated in the driving coils 31 when the power supply from the motor power supply source to the driving coils 31 is stopped. FIG. 3 shows waveforms of voltage and current that are applied to the driving coils 31 for one phase when the controls shown in FIGS. 2(A) and 2(B) are conducted. FIG. 4 shows waveforms in period a shown in FIG. 3, which includes periods b when voltage is applied to the driving coils 31 and periods c when the voltage supply to the driving coils 31 is stopped. More specifically, FIG. 4 shows a voltage waveform and a current waveform during periods b when a voltage is applied to the driving coils 31 and during periods c when the voltage supply to the driving coils 31 is stopped.

As shown in FIG. 2(A) and FIG. 3, when the power transistor Q4 is in an ON state and the power transistor Q1 is turned ON, the motor power supply potential VM is applied to the driving coils 31 from a motor power supply source 66, such that current flows through the driving coils 31. The current flows through the power transistor Q4 to the motor ground potential M.GND of the motor power supply source 66 (during periods b shown in FIG. 4). As shown in FIG. 4, the current gradually increases in accordance with a time constant of the driving coils 31.

On the other hand, as shown in FIG. 2(B) and FIG. 3, when the power transistor Q4 is in an ON state and the power transistor Q1 is turned OFF, the application of the motor power supply potential VM to the driving coils 31 from the motor power supply source 66 is stopped. At this moment, electromotive forces E1 and E2 are generated in the respective driving coils 31. The electromotive forces E1 and E2 cause regeneration current that flows in the driving coils 31 through a diode 61. The regeneration current gradually decreases in accordance with the time constant of the driving coils 31. However, before the regeneration current completely disappears, the power transistor Q1 is turned ON, and the motor power supply source 66 starts power supply.

In this manner, in the brushless motor using the direct PWM control system, a part of the motor current is supplied by the regeneration current, such that the current (power) to be externally supplied can be cut down. Also, since the power transistors through which the motor current flows are always in a saturated state, the power that may be consumed in the driver IC 60 is reduced to a minimum required level.

However, in the brushless motor using the direct PWM control system, the voltage that is applied to the driving coils 31 shifts between the motor power supply potential VM and the motor ground potential M.GND in a short period of time. As a result, the voltage applied to the wiring that extends from the driver IC 60 to the driving coils 31 or the wiring pattern of the metal substrate 40 as well as the voltage applied to the driving coils 31 continuously repeat rapid shifts, which generates electromagnetic noises. The electromagnetic noises cause a variety of adverse effects on the operation of the main apparatus that uses the brushless motor. Moreover, portions of the metal substrate 40 where the wiring patterns are formed over dielectric layers form capacitive coupling with respect to the driving coils 31 and the wirings, which results in the diffusion of the electromagnetic noises.

SUMMARY OF THE INVENTION

In view of the problems described above, it is an object of the present invention to provide a brushless motor using a direct PWM control system, which has a motor driving circuit provided on a circuit substrate that is independent of a motor main body, and which has a structure that can suppress the diffusion of electromagnetic noises.

In accordance with one embodiment of the present invention, a direct PWM brushless motor may have a motor main body mounted on a metal substrate and a motor drive circuit formed on a circuit substrate that is separated from the metal substrate. The motor main body may have a baring, a rotor shaft rotatably supported by the bearing, a rotor capable of rotating with the rotor shaft, and a stator having a core with a driving coil wound around the core. The motor drive circuit includes switching elements that are directly turned on and off. A switching pulse width for the switching elements is modulated to control current conducting through drive coils. In one aspect of the embodiment, the direct PWM brushless motor may have a wiring cable connection device for connecting the motor main body and a fixed potential of the motor drive circuit, and a conduction device that conductively connect a metal plate portion of the metal substrate to the wiring cable connection device.

In accordance with the embodiment of the present invention, the potential of the metal plate portion that defines a substrate of the metal substrate and forms a capacitive coupling with the wiring pattern is fixed at a specified potential through the wiring cable connection device and the conduction device. As a result, when the brushless motor is driven by the direct PWM control method, and the voltage applied to the wiring pattern that extends from the motor driving circuit to the driving coils as well as the voltage applied to the driving coils continuously repeat rapid shifts, electromagnetic noises can be prevented from diffusing through the metal substrate.

In accordance with the present invention, the metal plate of the metal substrate can be connected to the fixed potential through a connector mounted on the metal substrate for connecting the motor main body and the motor drive circuit, a lead wire that is electrically connected to the motor drive circuit, or a tap screw that is fixed at the metal substrate.

When the connector is used, the metal plate portion of the metal substrate can be readily connected to the fixed potential using a cable. When the lead wire is used, the metal plate portion of the metal substrate can be readily connected to the fixed potential without having to modify a connector that has been conventionally used.

The metal plate portion of the metal substrate can be connected to a fixed potential by any one of various methods. For example, a pin of the connector may be directly connected to the metal plate portion, or by connecting through a circuit pattern and a screw.

In accordance with the present invention, the fixed potential may be, for example, a ground potential of the motor drive circuit. Alternatively, the fixed potential may be a power source potential of the motor drive circuit.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

Embodiments of the present invention are described below with reference to the accompanying drawings. It is noted that each of the embodiments described below has a basic structure that may be common to the structure of the conventional art described above. Accordingly, elements that are common to those of the conventional structure are referred to by the same reference numbers. A common structure of the embodiments is first described below.

Figure 1:
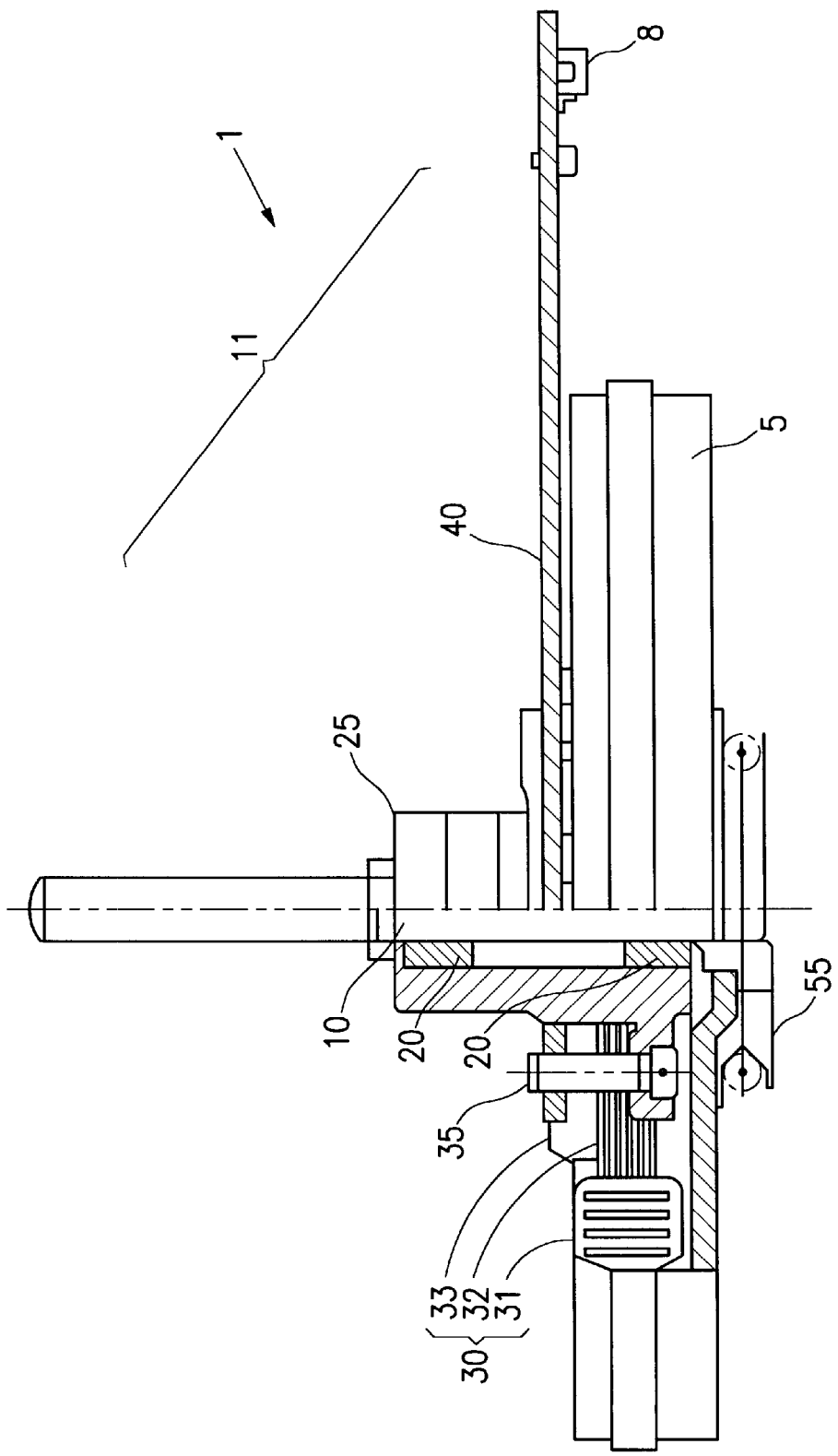
FIG. 1 shows a partially broken side view of a brushless motor with a direct PWM control system.

FIG. 1 shows a partially broken side view of a brushless motor 11.

Referring to FIG. 1, the brushless motor 1 has a motor main body 11 mounted on a metal substrate 40 and a motor drive circuit (not shown in FIG. 1) that is provided on a circuit substrate disposed at a location separated from the metal substrate 40. The metal substrate 40 may be formed from any appropriate metal such as iron or the like.

The motor main body 11 has a bearing holder 25, a pair of upper and lower bearings 20 such as sintered bearings that are retained in the bearing holder 25, and a rotor shaft 10 that extends through by the bearings 20. A rotor 5 having a pulley 55 is mounted on the rotor shaft 10. Cores 32 are retained at a stepped section formed on an outer peripheral surface of the bearing holder 25. A driving coil 31 is wound around an external periphery of each of the cores 32. Also, a drive magnet (not shown) is disposed on an internal peripheral surface of the rotor 5 in a manner to oppose to the outer peripheral surface of the cores 32. The cores 32 are covered by a core holder 33 formed from a resin, and the core holder 33 is covered by the metal substrate 40. The metal substrate 40, the core holder 33, the cores 32 are fixed together by screws 35. In this manner, the rotor 5 and the stator 30 are mounted with respect to the metal substrate 40 of the motor main body 11.

In accordance with the embodiment, the motor drive circuit is not formed on the metal substrate 40, but is formed on a circuit substrate of a main apparatus where control circuits for the main apparatus are provided. Therefore, a connector 8 is mounted on the metal substrate 40 to electrically connect the motor main body 11 and the motor drive circuit.

Figure 2B:
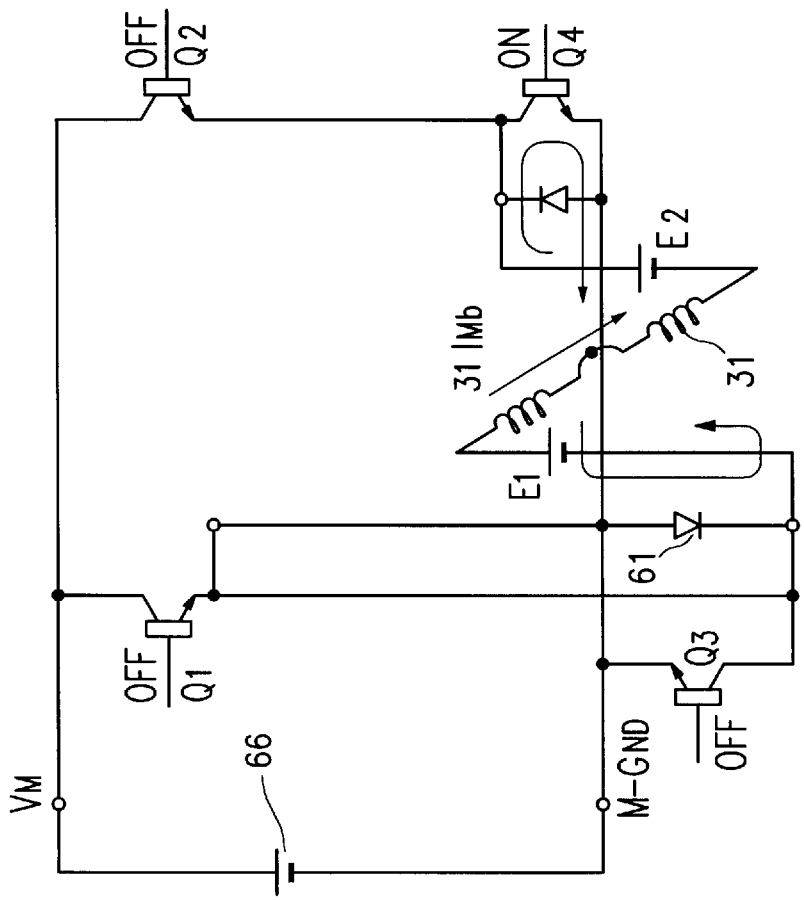
FIG. 2(B) shows a state in which regeneration current flows by a back electromotive force that is generated in the driving coils when the power supply from the motor power supply source to the driving coils is stopped.
Figure 2A:
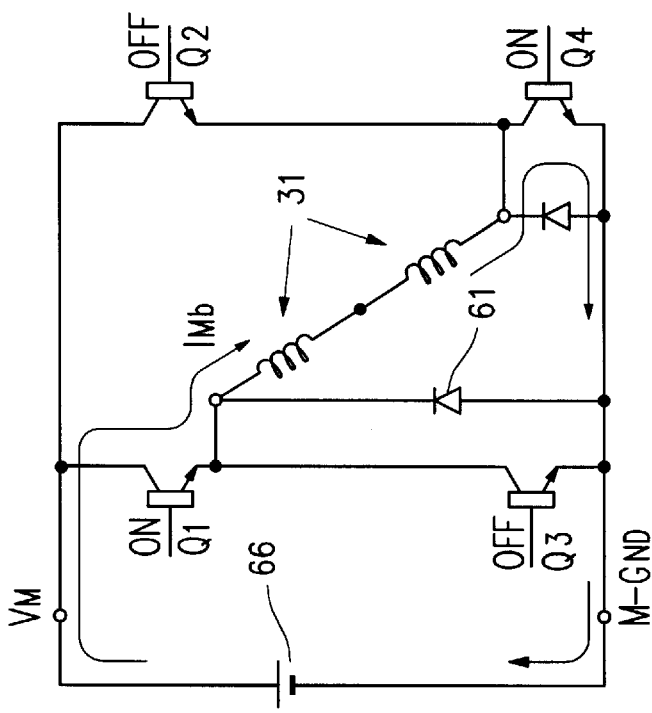
FIG. 2(A) shows a state of a motor drive circuit of the brushless motor shown in FIG. 1 in which power is supplied from a motor power supply source to driving coils.
Figure 3:
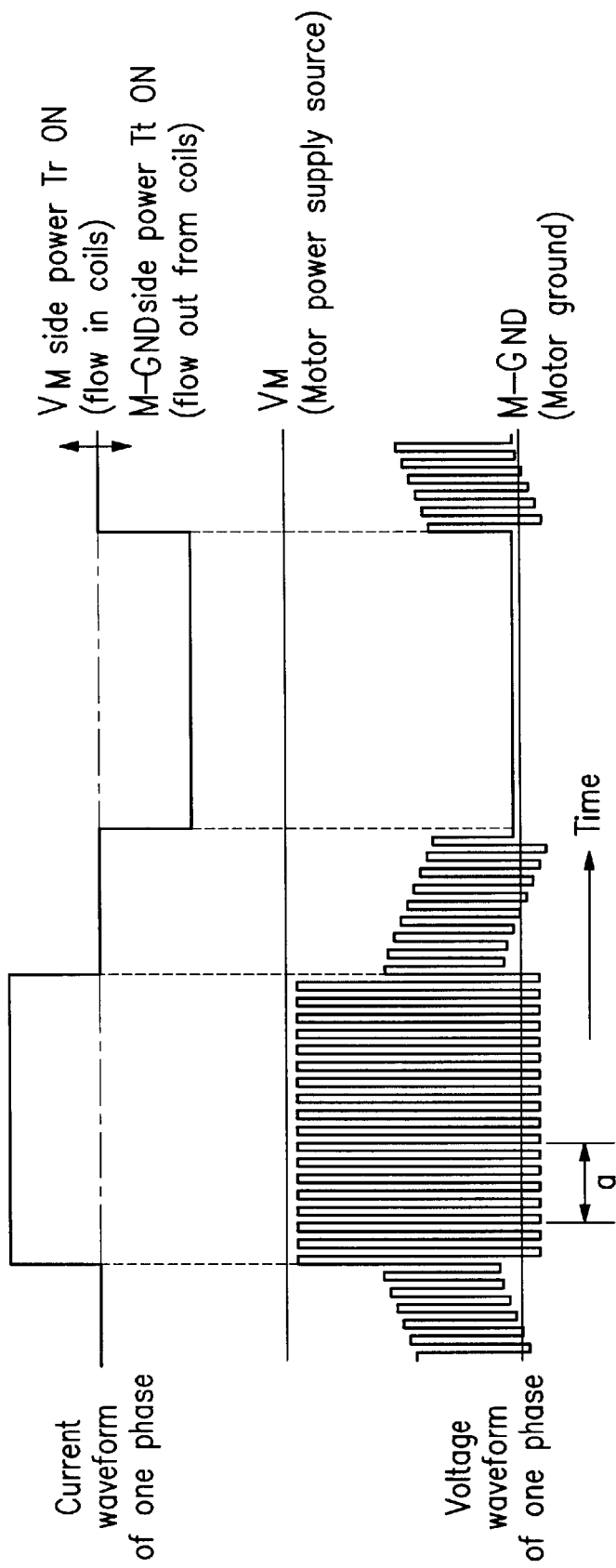
FIG. 3 shows waveforms of voltage and current that are applied to the driving coils for one phase when the controls shown in FIGS. 2(A) and 2(B) are conducted.
Figure 4:
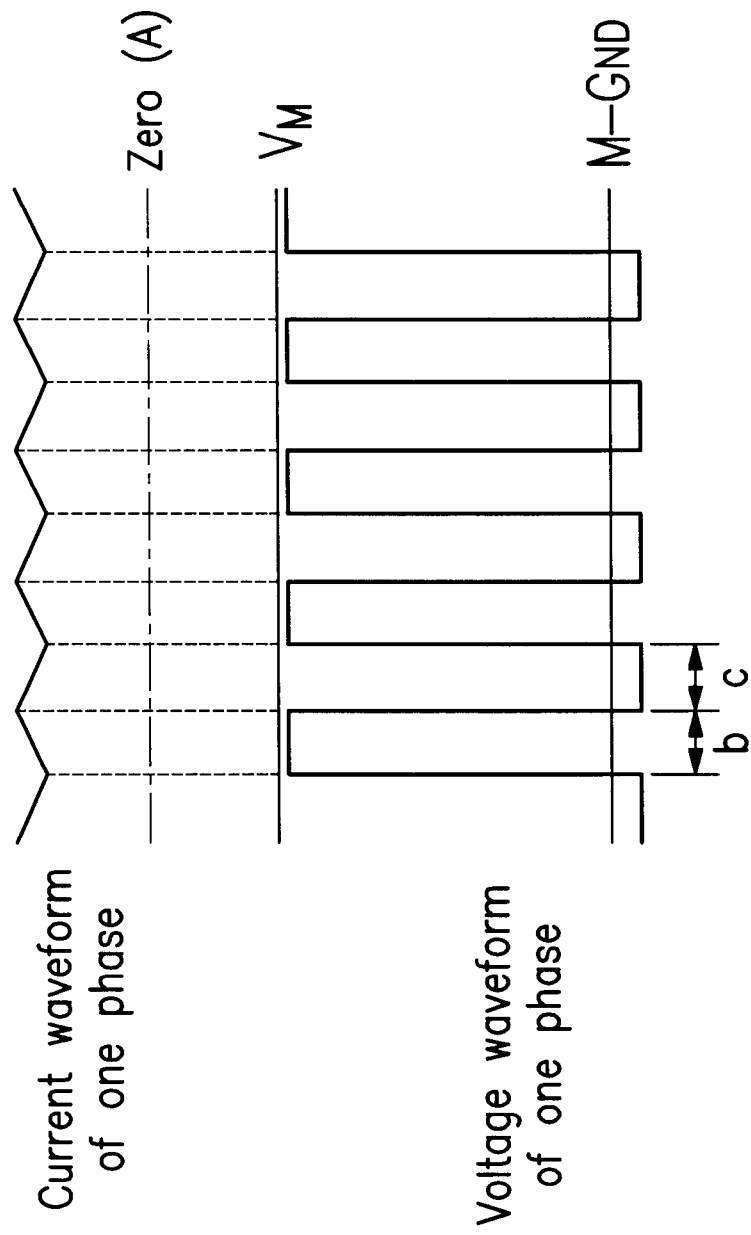
FIG. 4 shows a voltage waveform and a current waveform during periods b when a voltage is applied to the driving coils and during periods c when the voltage supply to the driving coils is stopped in period a shown in FIG. 3.

The motor drive circuit of the brushless motor thus constructed has a driver IC 60 that is similar to the conventional circuit described above with reference to FIGS. 2, 3 and 4. The state in which the power transistor Q4 is in an ON state and the power transistor Q1 is turned ON and the state in which the power transistor Q4 is in an ON state and the power transistor Q1 is turned OFF are alternately switched from one to the other. As a result, a part of the motor current is supplied by regeneration current.

Since the basic operation of the direct PWM control system is described above with reference to FIGS. 2, 3 and 4, the detailed description thereof is omitted. As described above, in the brushless motor using the direct PWM control system, the voltage applied to the wiring that extends from the driver IC 60 to the driving coils 31 as well as the voltage applied to the driving coils 31 continuously repeat rapid shifts, which generates electromagnetic noises. Moreover, the metal plate portion that is a main component of the metal substrate 40 forms capacitive coupling with the wiring patterns. Accordingly the metal plate portion of the metal substrate 40 diffuses the electromagnetic noises. In accordance with the embodiment of the present invention, countermeasures are provided to prevent the electromagnetic noises from diffusing through the metal substrate 40.

Figure 5:
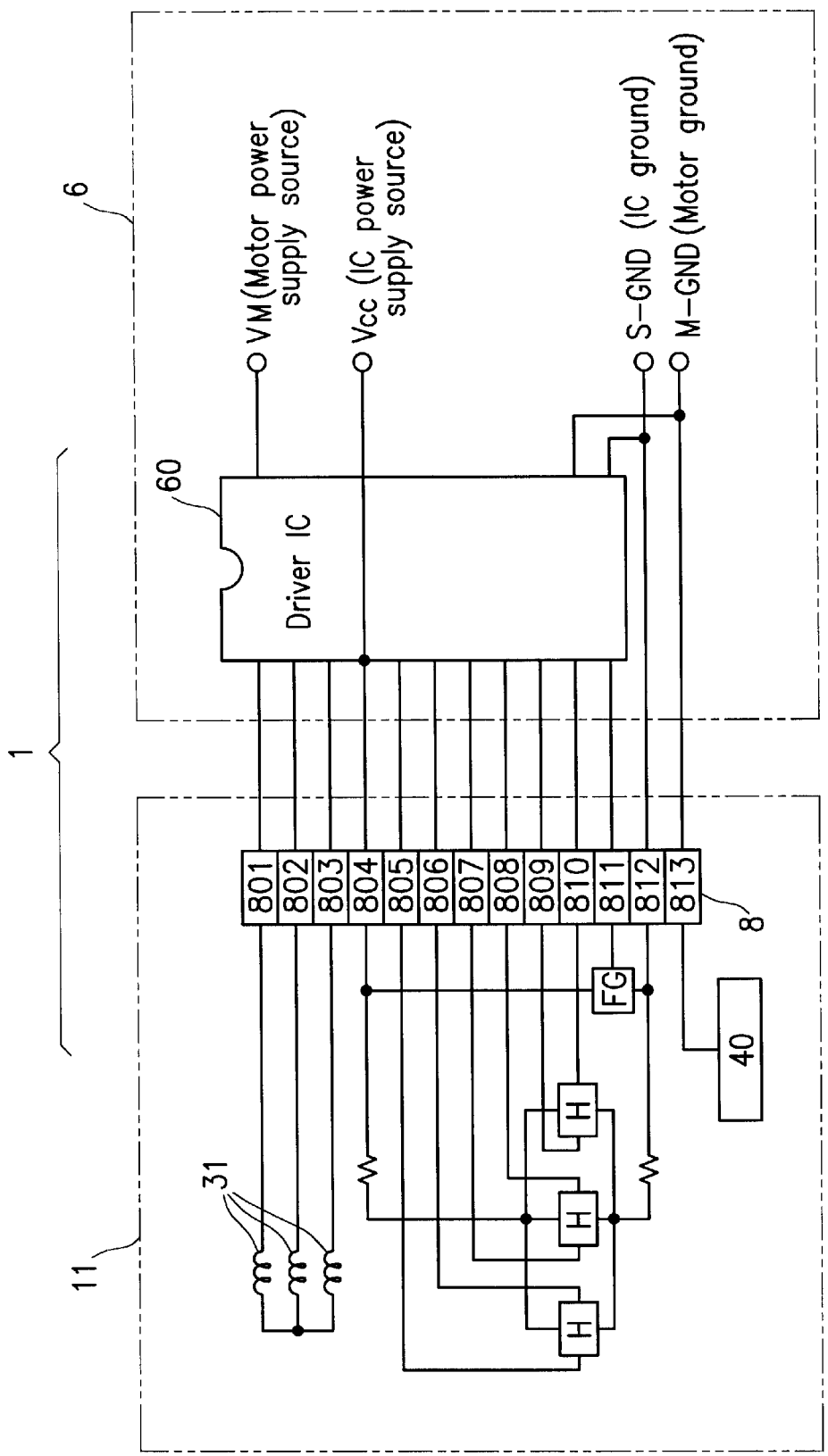
FIG. 5 shows a block diagram of an electrical connection structure between the motor main body and the motor drive circuit in the brushless motor in accordance with the first embodiment of the present invention.
Figure 6:
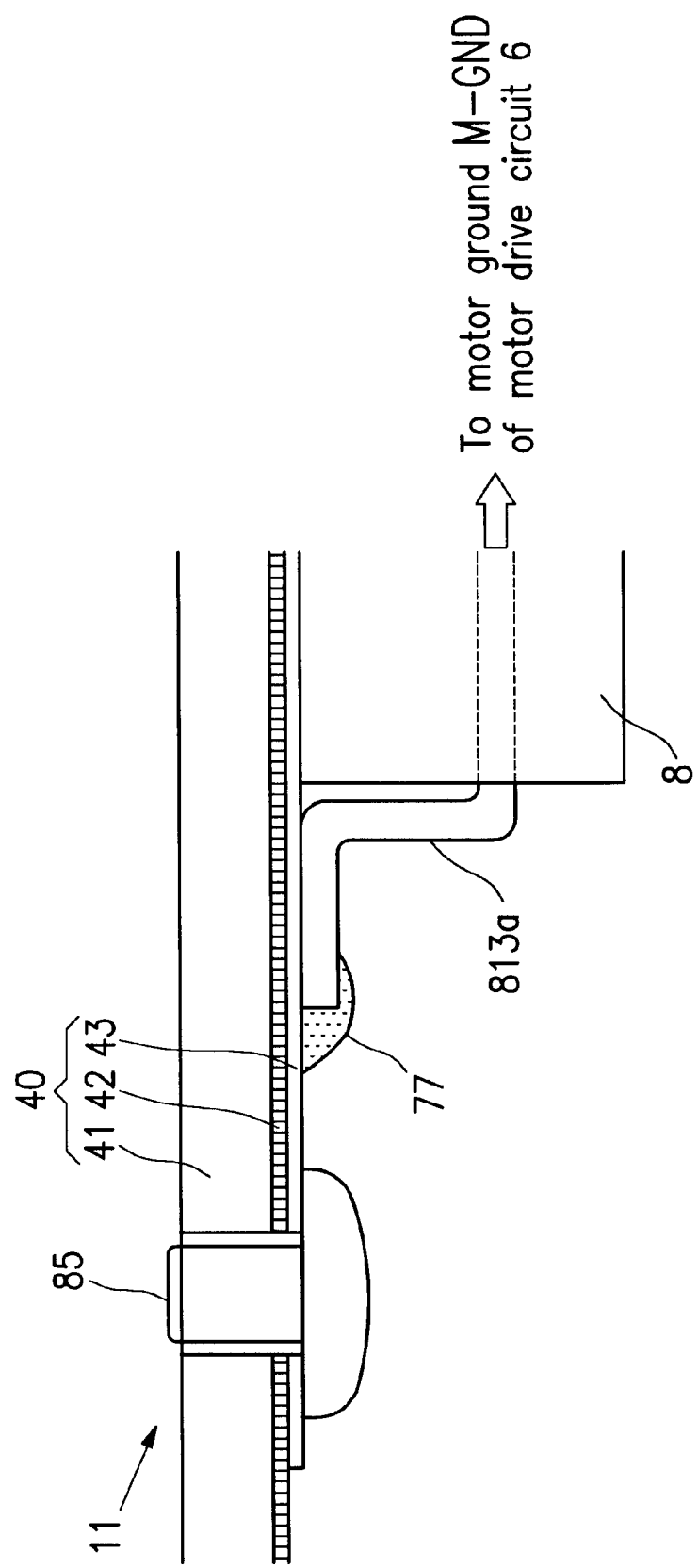
FIG. 6 shows a cross-sectional view of a conduction structure between a connector pin and the metal substrate in the brushless motor shown in FIG. 5.

FIG. 5 shows a block diagram of electrical connection between the motor main body and the motor drive circuit in the brushless motor using the direct PWM control system in accordance with an embodiment of the present invention. FIG. 6 shows a cross-sectional view of a conduction structure between the connector and the metal plate portion of the metal substrate in the brushless motor.

As shown in FIG. 5, the motor drive circuit 6 having the driver IC 60 is formed with a control circuit for controlling the main apparatus that uses the brushless motor 1 of the present embodiment. The motor drive circuit 6 is supplied with a motor power source potential VM, a motor ground potential M.GND, an IC power source potential Vcc and an IC grand potential S.GND.

In one aspect of the embodiment, the motor drive circuit 6 and the motor main body 11 are electrically connected to the connector 8 mounted on the motor main body 11 in a manner described below.

First, in accordance with the present embodiment, the motor drive circuit 6 that is provided in the control circuit for the main apparatus is connected to the motor main body 11 by a wiring cable connection device, such as, for example, a cable. The connector 8 for connecting to the cable is provided on the metal substrate 40. The connectors 8 may have thirteen pins 801 through 813 or more. In this embodiment, one of the thirteen pins is used to connect a metal plate portion 41 of the metal substrate 40 to a fixed potential of the motor drive circuit 6.

Twelve pins out of the thirteen pins are used in a similar manner as described above with reference to FIG. 8. More specifically, the connector pins 801 through 803 are used for power supply to three driving coils 31 of the motor. The connector pins 804 and 812 are used for supplying the IC power source potential Vcc and the IC grand potential S.GND to three Hall elements H and a sensor FG that is used for speed control of the motor. The connector pins 805 through 811 are used for outputting signals from the Hall elements H or the sensor FG.

In accordance with the present embodiment, the connector 8 has the pin 813 that defines a conduction device for connecting the metal substrate 40 to the motor ground potential M.GND. The motor ground potential M.GND is supplied to the metal plate portion 41 of the metal substrate 40 by the pin 813. The connection by the connector 8 is described below in detail with reference to FIG. 6.

As shown in FIG. 6, the metal substrate 40 is formed from the metal plate portion 41 that is a main component of the metal substrate 40, a dielectric layer 42 provided on the metal plate portion 41, and a wiring pattern 43 for ground potential provided on the dielectric layer 42. The pin 813 of the connector 8 has a terminal section 813a that is electrically connected to the wiring pattern 43 by solder 77. A tap screw 85 is screwed in a region where the wiring pattern 43 is formed. The tap screw 85 defines a conduction device of the present embodiment and has appropriately sized screw threads such that the metal plate portion 41 of the metal substrate 40 becomes conductive with the wiring pattern 43 for ground potential through the tap screw 85.

As a result, the metal plate portion 41 of the metal substrate 40 electrically connects to the motor ground potential M.GND of the motor drive circuit 6 through the tap screw 85 and the pin 813 of the connector 8. Accordingly, the metal plate portion 41 of the metal substrate 40 is always fixed at the motor ground potential M.GND. When the brushless motor is operated by the direct PWM control system, the voltage applied to the wiring pattern of the metal substrate 40 that extends from the driver IC 60 to the driving coils 31 as well as the voltage applied to the driving coils 31 continuously repeat rapid shifts between the motor power supply potential VM and the motor ground potential M.GND. However, the metal plate portion 41 of the metal substrate 40 that has capacitive coupling with the wiring pattern and the driving coils 31 does not diffuse the electromagnetic noises because the metal plate portion 41 of the metal substrate 40 is always fixed at the motor ground potential M.GND.

In the embodiment described above, the metal plate portion 41 of the metal substrate 40 is connected to the pin 813 of the connector 8 by using the wiring pattern 43 for ground potential and the tap screw 85. Alternatively, an aperture may be formed in the metal plate portion 41, the pin 813 of the connector 8 may be directly inserted in the aperture in the metal plate portion 41, and the pin 813 may be soldered to the metal plate portion 41.

Figure 8:
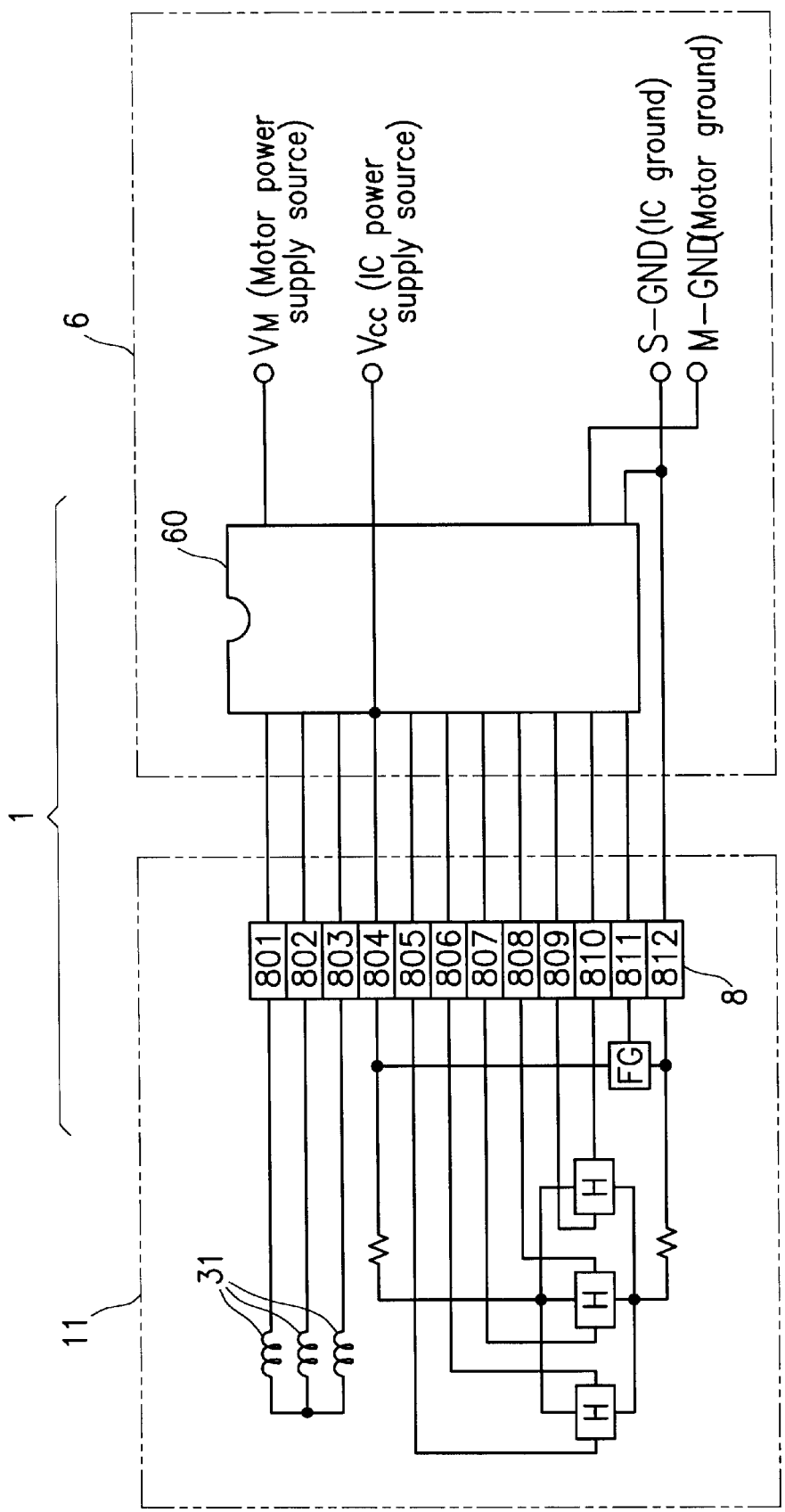
FIG. 8 shows a block diagram of an electrical connection between a motor main body and a motor drive circuit in a conventional brushless motor.

In the embodiment described above, the metal plate portion 41 of the metal substrate 40 is fixed at the motor ground potential M.GND by the use of the connector 8. However, when the connector 8 with twelve connector pins shown in FIG. 8 is provided, the metal plate portion 41 of the metal substrate 40 may be fixed at the motor ground potential M.GND by using a lead wire that defines a wiring cable connection device as described below.

Figure 7:
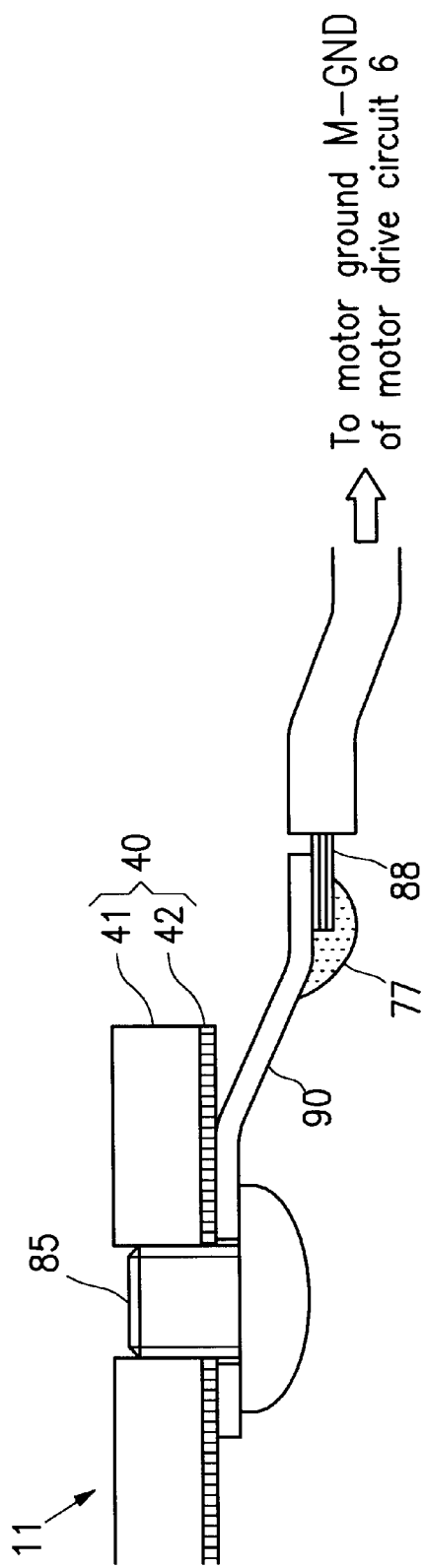
FIG. 7 shows a cross-sectional view of a conduction structure between a lead wire and the metal substrate in the brushless motor in accordance with a second embodiment of the present invention.

FIG. 7 shows a cross-sectional view of a conduction structure between the lead wire and the metal plate portion of the metal substrate in the brushless motor with the direct PWM control system in accordance with another embodiment of the present invention. The basic structures of the motor main body and the motor drive circuit are the same as those described above with reference to FIGS. 1 through 4, and therefore the description thereof is omitted.

Moreover, the motor main body and the motor drive circuit are connected through the connector 8 mounted on the metal substrate 40 in a similar manner as described above with reference to FIG. 8. The connector 8 in this embodiment has twelve pins, and the motor ground potential M.GND of the motor drive circuit 6 is not conductively connected to the metal plate portion 41 of the metal substrate 40 by the connector 8.

In accordance with an embodiment of the present invention, a lead wire 88 that defines a conduction device is electrically connected to the motor ground potential M.GND of the motor drive circuit 6 that is provided on the main apparatus. A rag plate with hole 90 that defines a part of the conduction device is connected to an end portion of the lead wire 88 by solder 77. The rag plate with hole 90 is affixed to the metal substrate 40 by a tap screw 85 that defines a part of the conduction device. As a result, the metal plate portion 41 of the metal substrate 40 is conductively connected to the motor ground potential M.GND of the motor drive circuit 6 shown in FIG. 8 through the tap screw 85, the rag plate with hole 90 and the lead wire 88.

Therefore, in the brushless motor 1 in accordance with the present embodiment, the metal plate portion 41 of the metal substrate 40 is always fixed at the motor ground potential M.GND. When the brushless motor 1 is operated by the direct PWM control system, the voltage applied to the wiring pattern of the metal substrate 40 that extends from the driver IC 60 to the driving coils 31 as well as the voltage applied to the driving coils 31 continuously repeat rapid shifts between the motor power supply potential VM and the motor ground potential M.GND. However, the metal plate portion 41 of the metal substrate 40 that has capacitive coupling with the wiring pattern does not spread the electromagnetic noises because the metal plate portion 41 of the metal substrate 40 is always fixed at the motor ground potential M.GND.

When the lead wire 88 is used in a manner described above, a wiring pattern may or may not be provided at a portion where the rag plate with hole 90 is affixed.

In the embodiments described above, the metal plate portion 41 of the metal substrate 40 is fixed at the motor ground potential M.GND. However, the metal plate portion 41 may be fixed at any one of fixed potentials. For example, the metal plate portion 41 may be conductively connected to the motor power supply potential VM so that the metal plate portion 41 is always fixed at the motor power supply potential VM.

As described above, in. the brushless motor with a direct PWM control system in accordance with the embodiments of the present invention, the potential of the metal plate portion that defines a main component of the metal substrate and forms a capacitive coupling with the wiring pattern is fixed at a specified potential through the conduction device. As a result, even when the voltage applied to the wiring pattern that extends from the motor driving circuit to the driving coils as well as the voltage applied to the driving coils continuously repeat rapid shifts, electromagnetic noises can be prevented from spreading through the metal substrate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A direct PWM brushless motor comprising:
    a motor main body mounted on a metal substrate having a metal plate portion, the motor main body having a bearing, a rotor shaft rotatably supported by the bearing, a rotor capable of rotating with the rotor shaft, and a stator having at least one core with a driving coil wound around the core;
    a motor drive circuit having at least one switching element that is directly turned on and off, in which a switching pulse width for the switching element is modulated to control current conducting through the driving coil, wherein the motor drive circuit is formed on a circuit substrate that is mechanically separate from the metal substrate;
    a wiring cable connection device for electrically connecting the motor main body to a fixed potential of the motor drive circuit; and
    a conduction device in electrical contact between the metal plate portion of the metal substrate and the wiring cable connection device, such that the metal plate portion is maintained at the fixed potential;
    wherein the wiring cable connection device includes a wiring cable and the conduction device has a connector mounted on the metal substrate and connected to wiring cable, wherein the metal plate portion of the metal substrate and the fixed potential of the motor drive circuit are electrically conductive through the wiring cable and the connector; and
    wherein the metal plate portion is formed from iron, an insulating layer is provided on the metal plate portion, and a wiring pattern is provided on the insulting layer for the fixed potential of the motor drive circuit.

2. A direct PWM brushless motor according to claim 1, wherein the conduction device is a pin of the connector mounted on the metal substrate.

3. A direct PWM brushless motor according to claim 1, wherein the connector has a pin that makes the metal plate portion of the metal substrate to be conductive with the fixed potential of the motor drive circuit.

4. A direct PWM brushless motor according to claim 1, wherein the wiring cable connection device is a lead wire that makes the metal plate portion of the metal substrate to be electrically conductive with the fixed potential of the motor drive circuit.

5. A direct PWM brushless motor according to claim 2, wherein the fixed potential is one of a ground potential of the motor drive circuit and a power source potential of the motor drive circuit.

6. A direct PWM brushless motor comprising:
    a motor main body mounted on a metal substrate having a metal plate portion, the motor main body having a bearing, a rotor shaft rotatably supported by the bearing, a rotor capable of rotating with the rotor shaft, and a stator having at least one core with a driving coil wound around the core;
    a motor drive circuit having at least one switching element that is directly turned on and off, in which a switching pulse width for the switching element is modulated to control current conducting through the driving coil, wherein the motor drive circuit is formed on a circuit substrate that is mechanically separate from the metal substrate;
    a wiring cable connection device for electrically connecting the motor main body to a fixed potential of the motor drive circuit; and
    a conduction device in electrical contact between the metal plate portion of the metal substrate and the wiring cable connection device, such that the metal plate portion is maintained at the fixed potential;
    wherein the wiring cable connection device includes a wiring cable and the conduction device has a connector mounted on the metal substrate and connected to wiring cable, wherein the metal plate portion of the metal substrate and the fixed potential of the motor drive circuit are electrically conductive through the wiring cable and the connector; and wherein the conduction device is a tap screw that is fixed on the metal substrate.

7. A direct PWM brushless motor comprising:

a motor main body mounted on a metal substrate having a metal plate portion, the motor main body having a bearing, a rotor shaft rotatably supported by the bearing, a rotor capable of rotating with the rotor shaft, and a stator having at least one core with a driving coil wound around the core;

a motor drive circuit having at least one switching element that is directly turned on and off, in which a switching pulse width for the switching element is modulated to control current conducting through the driving coil, wherein the motor drive circuit is formed on a circuit substrate that is mechanically separate from the metal substrate;

a wiring cable connection device for electrically connecting the motor main body to a fixed potential of the motor drive circuit; and a conduction device in electrical contact between the metal plate portion of the metal substrate and the wiring cable connection device, such that the metal place portion is maintained at the fixed potential;

wherein the wiring cable connection device includes a wiring cable and the conduction device has a connector mounted on the metal substrate and connected to wiring cable, wherein the metal plate portion of the metal substrate and the fixed potential of the motor drive circuit are electrically conductive through the wiring cable and the connector;

wherein the wiring cable connection device is a lead wire that makes the metal plate portion of the metal substrate to be electrically conductive with the fixed potential of the motor drive circuit; and wherein the conduction device is a soldered portion of the lead wire or a tap screw that is fixed on the metal substrate.

8. A direct PWM brushless motor comprising:

a motor main body mounted on a substrate having a metal plate, a dielectric layer formed on the metal plate and a wiring layer formed on the metal plate, the motor main body having a bearing, a rotor shaft rotatably supported by the bearing, a rotor capable of rotating with the rotor shaft, and a stator having at least one core with a driving coil wound around the core;

a motor drive circuit having at least one switching element in which a switching pulse width applied to the switching element is modulated to control current conducting through the driving coil, wherein the motor drive circuit is formed on a circuit substrate that is mechanically separate from the metal substrate; and a connection device for electrically connecting the metal plate of the substrate to a fixed potential of the motor drive circuit;

wherein the connection device includes a wiring cable and a connector mounted on the substrate and connected to the wiring cable, wherein the metal plate of the substrate and the fixed potential of the motor drive circuit are conductively connected through the wiring cable and the connector; and wherein the metal plate portion is formed from iron, an insulating layer is provided on the metal plate portion, and a wiring pattern is provided on the insulting layer for the fixed potential of the motor drive circuit.

9. A direct PWM brushless motor according to claim 8, wherein the connector includes a pin conductively connected to the metal plate of the substrate.

10. A direct PWM brushless motor according to claim 8, wherein the connector has a pin that makes the metal plate of the substrate to be conductive with the fixed potential of the motor drive circuit.

11. A direct PWM brushless motor according to claim 8, wherein the connection device includes a lead wire that conductively connects the metal plate of the substrate to the fixed potential of the motor drive circuit.

12. A direct PWM brushless motor according to claim 8, wherein the fixed potential is one of a ground potential of the motor drive circuit and a power source potential of the motor drive circuit.

13. A direct PWM brushless motor comprising:

a motor main body mounted on a substrate having a metal plate, a dielectric layer formed on the metal plate and a wiring layer formed on the metal plate, the motor main body having a bearing, a rotor shaft rotatably supported by the bearing, a rotor capable of rotating with the rotor shaft, and a stator having at least one core with a driving coil wound around the core;

a motor drive circuit having at least one switching element in which a switching pulse width applied to the switching element is modulated to control current conducting through the driving coil, wherein the motor drive circuit is formed on a circuit substrate that is mechanically separate from the metal substrate; and a connection device for electrically connecting the metal plate of the substrate to a fixed potential of the motor drive circuit;

wherein the connection device includes a wiring cable and a connector mounted on the substrate and connected to the wiring cable, wherein the metal plate of the substrate and the fixed potential of the motor drive circuit are conductively connected through the wiring cable and the connector; and wherein the connector includes a tap screw that is conductively connected to the metal plate of the substrate.

14. A direct PWM brushless motor comprising:

a motor main body mounted on a substrate having a metal plate, a dielectric layer formed on the metal plate and a wiring layer formed on the metal plate, the motor main body having a bearing, a rotor shaft rotatably supported by the bearing, a rotor capable of rotating with the rotor shaft, and a stator having at least one core with a driving coil wound around the core;

a motor drive circuit having at least one switching element in which a switching pulse width applied to the switching element is modulated to control current conducting through the driving coil, wherein the motor drive circuit is formed on a circuit substrate that is mechanically separate from the metal substrate; and a connection device for electrically connecting the metal plate of the substrate to a fixed potential of the motor drive circuit;

wherein the connection device includes a lead wire that conductively connects the metal plate of the substrate to the fixed potential of the motor drive circuit; and wherein the lead wire of the connection device includes a soldered portion or a tap screw that is conductively connected to the metal plate of the substrate.

* * * * *